Patented Jan. 5, 1954

2,664,997

UNITED STATES PATENT OFFICE 2,664,997

PACKAGE CONTAINING N-ALKYL PYRROLI-DONE-2, COMPOSITION THEREOF, AND PROCESS FOR ABSORBING ACETYLENE THEREBY

John C. Eck, Convent, N. J., assignor to Allied Chemical & Dye Corporation, New York, N. Y., a corporation of New York No Drawing. Application November 10, 1949, Serial No. 126,703

12 Claims. (Cl. 206—0.7)

This invention is directed to a new process of absorbing acetylene from gases containing the same and to solutions of acetylene in the solvent employed in that proceess. More specifically, this invention is directed to emloying as the solvent for acetylene an N-alkyl pyrrolidone-2 which may be represented by the following formula:

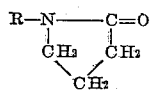

in which R represents a straight or branched chain alkyl radical having 1 to 8 carbon atoms in the chain.

Acetylene is present in many gases, either as an impurity, or as a substantial constituent which it is desired to recover from the gas. For example, numerous gases are known containing olefinic compounds and small quantities of acetylene which it is desirable to remove from the olefinic gas. Various procedures are known for producing gases containing acetylene from hydrocarbon gases such as methane or its higher homologs, or olefins such as ethylene, or from liquid hydrocarbons, including the heavier paraffins, aromatic hydrocarbons or cycloaliphatic hydrocarbons. Typical procedures for treating such hydrocarbons to form acetylene include the well-known arc processes, in which the gaseous or vaporous hydrocarbons are passed through an electric arc, or the various thermal decomposition processes, which involve heating the hydrocarbon gases or vapors to high temperatures, either by contact with hot refractory surfaces, or by partial combustion of the hydrocarbons themselves with oxygen or air. In all such processes there are obtained gaseous products containing acetylene mixed with various proportions of hydrogen, nitrogen, carbon dioxide, aliphatic hydrocarbons such as methane, and olefins particularly ethylene.

Whether the question is one of removing a small amount of acetylene as an impurity from a gas or of absorbing relatively larger amounts of acetylene from a gas to recover it separate from other constituents, it is important to employ for the purpose a material which is a good absorbent for acetylene and preferably one which is a relatively poor absorbent for other constituents of the gas.

I have discovered that the N-alkyl pyrrolidone-2 compounds in which the alkyl substituent is a straight or branched chain containing 1 to 8 carbon atoms in the alkyl radical are unusually good absorbents for acetylene in that these liquid pyrrolidone-2 compounds have unusually high solubility coefficients for acetylene as compared with other compounds which have heretofore been proposed for use in absorbing acetylene from gases containing it. This absorption coefficient is the volume of a given gas which is absorbed by one volume of liquid absorbent under given conditions of temperature, pressure and gas composition at which the gas is contacted with the absorbent. In keeping with the usual practice, the absorption coefficients given in this specification are for a pure acetylene or other gaseous compound contacted with the liquid at one atmosphere total pressure of the gas and vapor pressure of the liquid and at 20° C. unless some other temperature is specified.

In addition to their high absorption coefficients for acetylene gas, the N-alkyl pyrrolidone-2 compounds employed by me as an absorbent for acetylene, have other properties particularly fitting them for the purpose. They have low vapor pressures. As a result, in contacting a gas containing acetylene with these liquids to absorb the acetylene, relatively small amounts of the liquid vaporize into the gas and are lost or require treatment of the affluent gas to recover the solvent. They have high boiling points, which permits warming the solution of acetylene in the solvent to recover the acetylene therefrom with relatively small amounts of the solvent being vaporized with the acetylene. With their high absorption coefficiencies for acetylene, high boiling points and low vapor pressures, they are fluid liquids at suitable operating temperatures so that they may be readily circulated into intimate contact with a gas to absorb the acetylene therefrom. Finally, with their high absorption coefficient for acetylene, they have relatively low absorption coefficients for ethylene so that in absorbing acetylene from a gas also containing ethylene a proportionately large amount of acetylene is absorbed as compared with the amount of ethylene absorbed.

My invention is, therefore, directed to washing a gas containing acetylene with an N-alkyl pyrrolidone-2 in which the alkyl radical contains 1 to 8 carbon atoms, to absorb the acetylene from the gas. Of these alkyl pyrrolidone-2 compounds, as the number of carbon atoms in the alkyl radical is increased or as the alkyl radical is a branched instead of a straight chain, the absorption coefficient for acetylene is decreased. On the other hand, even with increasing sizes (up to 8 carbon atoms) and branching of the carbon chain of the alkyl radical, the acetylene absorption coefficients of these compounds remain high and their increasing boiling points are advantageous. This is shown by the following table of absorption coefficients:

| Alkyl radical of the N-alkyl pyrrolidone-2 | Acetylene absorption coefficient (20° C.) | Boiling Point (° C.) |
|---|---|---|
| Methyl | 43 | 197–202 (736 mm.). |
| Ethyl | 39 | 218 (751 mm.). |
| n-Propyl | 38 | 212 (754.5 mm.). |
| Isopropyl | 33 | 221–222 (754.5 mm.). |
| n-Hexyl | 33 | 243 (754.5 mm.). |
| n-Octyl | 30 | |

These absorption coefficients and boiling points of the N-alkyl pyrrolidone-2 compounds may be compared with the following absorption coefficients of other materials heretofore considered good absorbents for acetylene:

| | Acetylene absorption coefficient (20° C.) | Boiling point at atmos. pressure (° C.) |
|---|---|---|
| Dimethyl formamide | 36 | 153 |
| Dioxane | 19.5 | 101 |
| Acetone | 17.5 | 56.5 |
| γ-Butyrolactone | 17 | 206 |
| Cyclohexanone | 14 | 155 |

Taking into account all factors pertinent to the use of the N-alkyl pyrrolidone-2 compounds as absorbents for acetylene, I prefer to employ those in which the alkyl radical has a straight chain of 1 to 8 carbon atoms. In addition to the compounds listed in the first of the above tables, I prefer to employ the N-n-amyl and N-n-heptyl pyrrolidone-2 as absorbents for acetylene.

Other than employing my particular solvents for the acetylene, the process of my invention is carried out under those conditions generally known as suitable for absorbing a gas in a liquid solvent in which the gas dissolves without chemical reaction with the solvent. Those factors known to influence the absorption of gases in such liquids, including temperature, pressure, gas composition, intimacy of contact between the gas and liquid, have similar effects in absorbing acetylene employing my particular alkyl pyrrolidone solvents as in the general art of absorbing a gas in a liquid solvent. Accordingly, in absorbing acetylene from a gas employing an alkyl pyrrolidone, I prefer to contact the gas and absorbent at atmospheric or lower temperatures, under total gas pressures of atmospheric or higher and employ an absorption procedure which insures intimate contact of the gas and the liquid absorbent. When, on the other hand, acetylene is to be recovered from solution in the alkyl pyrrolidone, this is accomplished by reducing the pressure over the solution or by warming the solution to higher temperatures as compared with the pressure and temperature used during the absorption step, or by both reducing the pressure and warming the solution.

Apart from their formation as an incident to absorbing acetylene from gases containing the same, solutions of acetylene in the above-described alkyl pyrrolidones are useful per se. Thus, it is frequently desirable to obtain acetylene in a form in which it may be stored or shipped without having to provide the large volume containers required for a gas at pressures near atmospheric or containers of pressure-resistant construction which permit handling compressed gases. The high absorption coefficients of acetylene in those alkyl pyrrolidones make them particularly suitable for use in conjunction with the storage and transportation of acetylene in the form of solutions in those solvents. Accordingly, my invention extends to a solution of acetylene in an N-alkyl pyrrolidone-2 specified above as a suitable absorbent for acetylene, preferably one in which the alkyl radical is a straight chain of 1 to 7 carbon atoms, and to packages comprising such a solution within a closed vessel.

The following examples more particularly illustrate my invention without, however, being limitations thereon:

Example 1.—N-methyl pyrrolidone-2 has absorption coefficients for acetylene of 43.0 at 20° C., 71.5 at 0° C. and 170 at −35° C.

A gas substantially consisting of acetylene is intimately contacted with N-methyl pyrrolidone-2 at a temperature of 20° C. and under atmospheric pressure until the solution is substantially saturated with the acetylene. The resulting solution, which contains, for example, about 40 volumes of acetylene per volume of the methyl pyrrolidone, is stored or shipped in a closed vessel of suitable construction to resist the low pressures developed by the solution at atmospheric temperatures. Such pressures are far below those developed by the same quantity of acetylene gas in a container of the same size but without the N-methyl pyrrolidone-2 present as a solvent for the acetylene.

By cooling the acetylene gas and solvent to 0° C. and absorbing the gas at that temperature until the solvent is substantially saturated with acetylene, a solution containing about 60–65 volumes of acetylene per volume of liquid N-methyl pyrrolidone-2 is prepared. By substantially saturating the solvent with acetylene at even lower temperatures, e. g. −35° C., solutions containing much greater amounts of acetylene are obtained, e. g. up to 150 or more volumes of acetylene per volume of solvent. When stored in a closed container at room temperature the acetylene pressure developed over these solutions prepared at 0° C. or below will permit drawing off acetylene gas from the container under pressures above atmospheric.

Example 2.—N-methyl pyrrolidone-2 has the following absorption coefficients and relative absorptions at 20° C.

*Absorption coefficients*

For acetylene _____ 43.0
For ethylene _____ 5.0
For carbon dioxide _____ 11.6

*Absorption ratios*

$$\frac{\text{Acetylene}}{\text{Ethylene}} \quad 8.6$$

$$\frac{\text{Acetylene}}{\text{Carbon dioxide}} \quad 3.7$$

By partial combustion of methane with air, a gas having substantially the following composition is obtained:

4.00% acetylene
0.25% ethylene
1.25% carbon dioxide
10.75% carbon monoxide
24.00% hydrogen
6.50% methane
53.25% nitrogen This gas under a pressure of 95 pounds per square inch absolute is washed in a countercurrent scrubbing tower with N-methyl pyrrolidone-2 to absorb the acetylene. About 0.11 liters of the absorption liquid are contacted with every 100 liters of the gas under the aforesaid pressure and at about 20° C. The resulting solution of acetylene contains small amounts of ethylene and carbon dioxide in the approximate ratio of 100 volumes acetylene to 1 volume ethylene to 8–10 volumes carbon dioxide. The nitrogen, hydrogen and methane in the above gas largely pass through unabsorbed by the liquid.

This solution is withdrawn from the absorber and expanded to a pressure of 4.4 pounds per square inch absolute. In this step a part of the acetylene and a relatively larger proportion of the ethylene and carbon dioxide initially absorbed by the methyl pyrrolidone are released from solution. The remaining solution is then expanded to a pressure of 0.15 pound per square inch absolute. Under this pressure a concentrated acetylene gas is evolved from the solution. Residual carbon dioxide in this recovered gas may be removed by washing the gas with a solution of sodium carbonate. The liquid solvent from which acetylene has thus been recovered may be returned for renewed contact with acetylene gas produced by the partial combustion of the methane. The gas containing acetylene evolved in the first pressure reduction stage may be mixed with the gas from the partial combustion of the methane for recovery of the acetylene by washing the mixed gases with the N-methyl pyrrolidone-2. In evolving absorbed gases by the reduction of pressure, the solution is maintained under substantially the same temperature of about 20° C. as that at which the acetylene is initially absorbed in the solvent.

*Example 3.*—A gas substantially consisting of acetylene is intimately contacted with N-n-heptyl pyrrolidone-2 at a temperature of 20° C. and under atmospheric pressure until the solution is substantially saturated with the acetylene. The resulting solution, containing 25–30 volumes of acetylene per volume of the N-n-heptyl pyrrolidone-2, is stored or shipped in a closed vessel resistant to the low pressures developed by the solution at atmospheric temperatures.

In describing the use of the individual N-alkyl pyrrolidone-2 compounds as absorbents for acetylene and the resulting solutions of acetylene in these solvents, it should be understood that mixtures of two or more of these compounds may be employed in the same way as the individual compounds. Such mixtures show high acetylene absorption coefficiencies, of the order of those of the individual components of the mixture. Furthermore, in employing the higher N-alkyl pyrrolidones, such as those containing 5 to 8 carbon atoms in the alkyl chain, a desirable lowering of the viscosities of these materials may be obtained by mixing with them a lower N-alkyl pyrrolidone-2, e. g. methyl or ethyl N-alkyl pyrrolidone-2. Such mixtures have a lower viscosity than that of the higher N-alkyl pyrrolidone and have boiling points higher than those of the methyl or ethyl N-alkyl pyrrolidones.

I claim:

1. In a process for absorbing acetylene from gases containing the same by contact with a liquid solvent for the acetylene, that improvement which comprises contacting the gas with N-alkyl pyrrolidone-2 having 1 to 8 carbon atoms in the alkyl radical.

2. The process of claim 1 in which the gas is contacted with N-alkyl pyrrolidone-2 having a straight chain of 1 to 8 carbon atoms in the alkyl radical.

3. The process of claim 1 in which the gas is contacted with N-methyl pyrrolidone-2.

4. As a new composition of matter, a solution of acetylene in N-alkyl pyrrolidone-2 having 1 to 8 carbon atoms in the alkyl radical.

5. As a new composition of matter, a solution of acetylene in N-alkyl pyrrolidone-2 having a straight chain of 1 to 8 carbon atoms in the alkyl radical.

6. As a new composition of matter, a solution of acetylene in N-methyl pyrrolidone-2.

7. In combination a solution of acetylene in N-alkyl pyrrolidone-2 within a container for said solution, said alkyl pyrrolidone containing 1 to 8 carbon atoms in the alkyl radical.

8. In combination a solution of acetylene in N-methyl pyrrolidone-2 within a container for said solution.

9. The process of claim 1 in which the gas is contacted with N-ethyl pyrrolidone-2.

10. The process of claim 1 in which the gas is contacted with N-propyl pyrrolidone-2.

11. A process of removing acetylene from a gaseous mixture by treating it with a N-alkyl pyrrolidone the alkyl radical of which is a saturated hydrocarbon radical not containing more than 3 carbon atoms.

12. A composition of matter consisting essentially of a solution of acetylene in a N-alkyl pyrrolidone the alkyl radical of which is a saturated hydrocarbon radical not containing more than 3 carbon atoms.

JOHN C. ECK.

References Cited in the file of this patent

UNITED STATES PATENTS

| Number | Name | Date |
|---|---|---|
| 2,063,680 | Isham | Dec. 8, 1936 |
| 2,217,429 | Balcar | Oct. 8, 1940 |
| 2,431,675 | Bour | Dec. 2, 1947 |
| 2,431,676 | Bour | Dec. 2, 1947 |